Nov. 13, 1951 M. G. CROSBY 2,575,047

EXALTED CARRIER RECEIVER

Filed July 14, 1948 3 Sheets-Sheet 1

INVENTOR
Murray G. Crosby
BY Alfred E. Page
ATTORNEY

Nov. 13, 1951 M. G. CROSBY 2,575,047

EXALTED CARRIER RECEIVER

Filed July 14, 1948 3 Sheets-Sheet 2

INVENTOR
Murray G. Crosby
BY Alfred E. Page
ATTORNEY

Nov. 13, 1951 M. G. CROSBY 2,575,047

EXALTED CARRIER RECEIVER

Filed July 14, 1948 3 Sheets-Sheet 3

INVENTOR
Murray G. Crosby
BY Alfred E. Gage
ATTORNEY

Patented Nov. 13, 1951 2,575,047

UNITED STATES PATENT OFFICE 2,575,047

EXALTED CARRIER RECEIVER

Murray G. Crosby, Riverhead, N. Y.

Application July 14, 1948, Serial No. 38,710

10 Claims. (Cl. 250—20)

This invention relates generally to the reception of modulated carrier waves and, more particularly, to a novel radio receiver of the carrier wave exaltation type capable of receiving all of the types of modulation normally encountered, such as telegraphic, voice, facsimile, etc. The receiver is preferably in the form of an adapter which is connected to a communications type receiver arranged to receive intelligence transmitted over carrier frequency ranges lower than approximately 30 mc.

In these frequency ranges, ionospheric transmission is normally encountered, resulting in multipath transmission of the signals. Such multipath transmission results in the signals arriving at the receiver over two or more paths of different length, and is apparent at the receiver as "fading." Such fading is frequently selective, altering the normal amplitude relations between the carrier wave and its side band components due to the fading of the carrier to a greater extent than the fading of its modulation.

For example, in the case of single-tone amplitude modulation of a carrier wave, the modulated wave consists of a carrier component on a center frequency and two side bands equally spaced in frequency above and below the carrier frequency. The selective fading may destroy the intelligence transmitted by introducing harmonic distortion through the mentioned alteration of the amplitude relations between the carrier and its side bands. The carrier component may fade completely, leaving only the side bands, which beat against each other in the receiver, thus destroying the intelligibility of the signals.

The harmful effects due to such fading may be overcome by using the exalted-carrier principle of reception described in my articles "Communication by Phase Modulation" and "Exalted-Carrier Amplitude- and Phase-Modulation Reception" appearing in the February 1939 and September 1945 issues of the Proceedings of I. R. E., respectively. In this type of reception, the carrier of the modulated wave is separated from the carrier and side band components, constituting the modulated wave, by means of a selective filter. The separated carrier may then be amplified or otherwise treated for recombination with the original modulated wave in a manner to reduce the distortion resulting from the selective fading. This type of reception thus salvages the intelligibility from the distorted incoming modulated wave.

Another undesirable result of such selective fading is the tendency of the automatic frequency control to assume control of the side band frequency instead of the carrier frequency. This effect is generally called "side band grabbing," and occurs during reception of tone modulated signals. The selective fading varies the relative amplitudes of the carrier and its sidebands, and may make the strength of a sideband greater than that of the carrier. As a result, the automatic frequency control detunes itself from the carrier frequency and assumes control of the sideband frequency.

The selective fading thus results in a functioning of the automatic frequency control alternately on the carrier or on one of its sidebands. During the intervals in which the control functions on a sideband, distortion results and intelligible reception is practically destroyed, since the received heterodyned waves are no longer centered with respect to the intermediate frequency pass band of the receiver. As a consequence, reception of tone modulation on an exalted-carrier type of receiver has hitherto been unsatisfactory, which is important as such tone modulation is used in many forms of modulation, as are, for example, employed in multiplex telegraphy and in facsimile.

To overcome these difficulties, the reception process of the present invention utilizes an improved system of carrier exaltation including means for substantially completely attenuating the sidebands before the incoming modulated wave is fed to the automatic frequency control circuits. Additionally, part of the components of the exalted-carrier circuits are utilized, in conjunction with other components, to provide for the reception of telegraphic signals in their various forms, including frequency shift telegraphic signals, and also to provide a convenient arrangement for observing the degree of modulation of a frequency, phase, or frequency-shift modulated carrier wave. Thus, a multi-purpose device, with a high degree of flexibility, is provided.

The automatic-frequency-control system of the present invention is different from those of the prior art in that a very sharp selectivity precedes the automatic-frequency-control discriminator and detectors. The selectivity of the systems of the prior art has been relatively broad so that in the case of a detuned signal, the automatic-frequency-control system would receive energy in the detuned condition and the AFC could function to bring the signal properly in tune. However, such a system has the disadvantage that this broad selectivity allows other interfering signals to obtain control of the AFC system. These interfering signals may comprise undesired interfering carriers, or may be some of the sidebands of the desired signal itself. In the latter case, the term "sideband grabbing" is introduced.

It might be at first that, with such a high degree of selectivity preceding the AFC system, the AFC system would not be able to function. However, with such a system, the normal operation is to first tune the signal through the sharp selectivity so that the AFC system may obtain control. Then slight deviations in frequency, which are still able to pass the sharp selectivity, will be made still smaller by the AFC system. As an example, let it be assumed that the sharp selectivity preceding the AFC system is approximately 20 cycles wide. Furthermore, let it be assumed that the automatic-frequency-control sensitivity is such as to reduce a 100-cycle frequency shift to a one-cycle shift. In other words, without automatic-frequency control the intermediate frequency shifts 100 cycles when the incoming signal shifts 100 cycles, but with automatic-frequency-control, the intermediate frequency shift is reduced 100 times, or to one cycle. Under these circumstances, the signal could shift as much as 100 times 20 cycles or 2000 cycles before the intermediate frequency being passed through the 20-cycle selectivity would be detuned sufficiently to be down on the side of the selectivity. In this way the AFC system is able to hold in control on a signal which has been properly tuned through the sharp selectivity. It is true that the AFC system will be unable to reach out and obtain control of the signal outside the range of the sharp selectivity. However this particular feature is an advantage instead of a disadvantage. It is this feature which prevents interfering signals or sidebands from assuming control of the AFC system.

Another feature of my invention is the incorporation of single-sideband separating circuits using the principle of balancing to reject the unwanted sideband, rather than the more conventional filter method. The application of such a balancing method to signal transmission was first disclosed in U. S. Patent No. 1,666,206, issued to R. V. L. Hartley, but has had only limited use due to the lack of a wideband phase-shift network capable of performing the necessary function of shifting the phase of a band of audio frequencies by a fixed amount of 90°. Such networks, making this method of sideband separation for transmission more feasible, have since been described by R. B. Dome in an article entitled "Wideband Phase Shift Networks," on page 112 of the December 1946 issue of "Electronics." The present receiver applies, to the reception of signals, the Hartley balancing method of sideband separation incorporated with the Dome networks in a new and useful manner.

A further feature, contributing to the wide flexibility of the invention, is the incorporation of a beating oscillator in the receiving equipment for the reception of radio telegraphic signals. The oscillator may be adjusted to heterodyne on-and-off keyed CW (continuous wave) signals and may be coordinated with the single-sideband separation circuits to obtain "single signal" reception, with the interference due to image beat-notes rejected by the single-sideband selection. Such sideband rejection may be utilized to provide a new type of reception of frequency-shift telegraphy, in which the unused space wave is rejected by the sideband separation networks.

It is accordingly an object of the present invention to provide a multi-purpose modulated carrier-wave receiver having a wide range of flexibility.

Another object is to provide such a receiver in the form of an adapter connectible to an ordinary communications receiver.

A further object is to provide such a receiver having improved carrier-exaltation means.

A still further object is to provide such a receiver of the carrier-exaltation type including means for preventing "sideband grabbing" by the automatic frequency control.

Still another object is to provide such a receiver incorporating novel means for single-sideband separation by balancing to reject the unwanted sideband in novel combination with a wideband phase-shift network.

Yet another object is to provide a new type of reception of frequency-shift telegraphic signals in which an unused space wave is rejected by the afore-mentioned sideband separation means.

These, and other objects, advantages and novel features of the invention will be apparent from the following description and the accompanying drawings.

Figure 1:
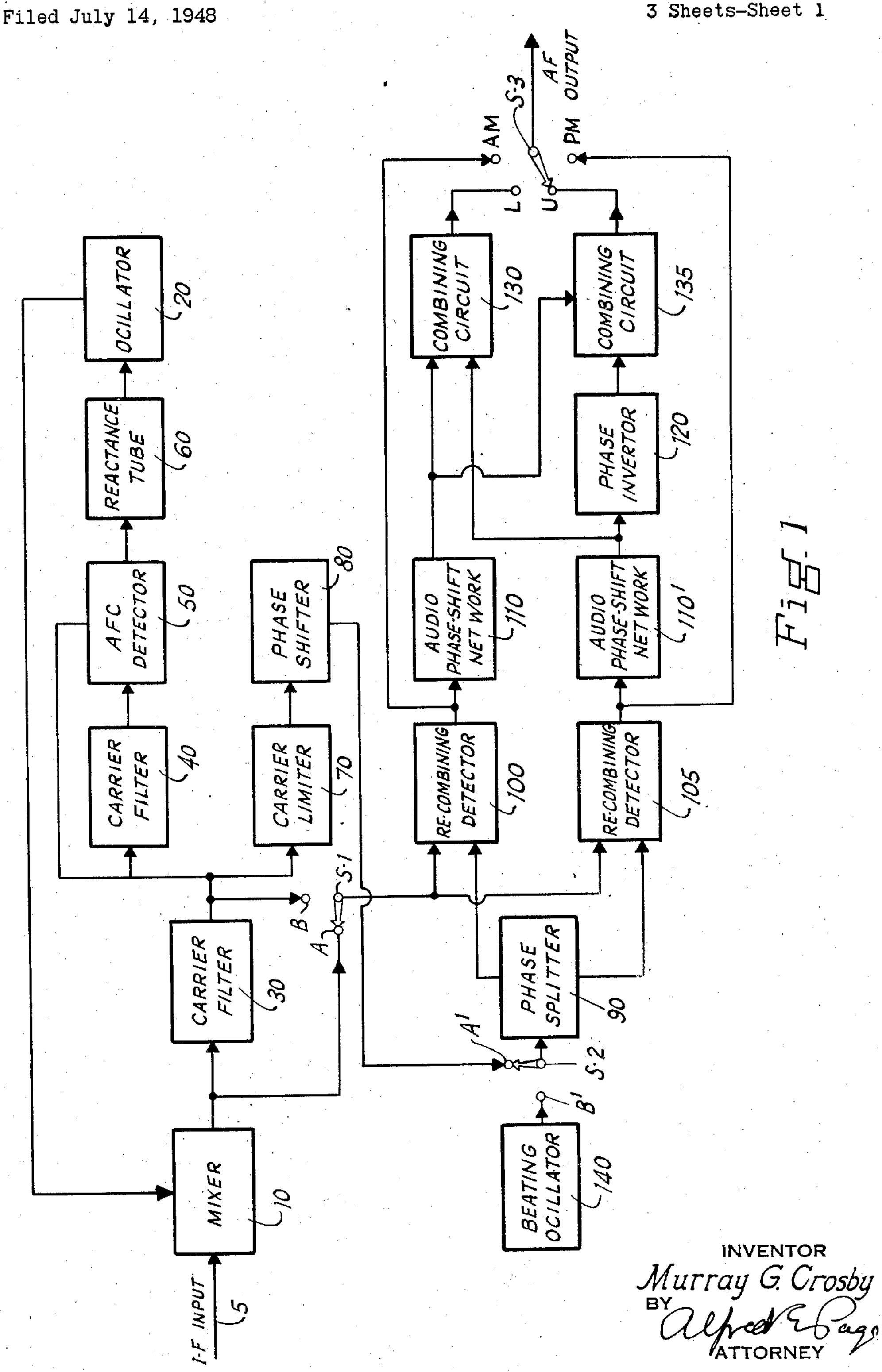
Fig. 1 is a schematic block diagram illustrating the component parts of the exalted-carrier adapter circuits, and their interrelation.

The operation of the improved exalted-carrier circuits of the invention will be understood best by reference to the schematic block diagram of Fig. 1. As indicated at 5, an intermediate frequency input is obtained from a selected intermediate frequency of a communications type receiver, and this intermediate frequency input is fed to a mixer 10. In mixer 10, the input intermediate frequency is heterodyned with the output of oscillator 20 to provide a new, or output, intermediate frequency at the output of mixer 10.

The new intermediate frequency at the output of mixer 10 is fed through a carrier filter 30 which is sufficiently selective to reject the sidebands of modulation appearing in the output of mixer 10. The output of carrier filter 30 is fed to an automatic frequency control system through a second carrier filter 40 and a detector 50. Filter 40 has a selectivity of the same order as that of filter 30. Consequently, the automatic frequency control potential at the output of detector 50 is sufficiently sharp to control the frequency of oscillator 20, through reactance tube 60, in a manner to hold the output intermediate frequency of mixer 10 in proper tune with carrier filters 30 and 40.

It is important to note that the control potential at the output of detector 50 has had the sidebands of modulation effectively limited through the action of selective carrier filters 30 and 40. Consequently, only the unmodulated frequency, or simply the carrier of reduced frequency in the output of mixer 10, is fed to the automatic frequency control system 40, 50, and the latter is thereby prevented from "sideband grabbing." Thus, distortion due to the automatic frequency control taking effect on the sidebands, in the case of selective fading, is substantially eliminated. Sidebands and other interfering signals are rejected by the use of the carrier filter 30, and hence cannot assume control of the AFC system 20, 40, 50, 60. Such assumption of control was possible with prior art receivers of the exalted-carrier type due to the use of a single carrier filter for the two functions of carrier filtering and automatic frequency control.

The output of carrier filter 30 is branched, as indicated, and the second branch is connected to the contact B of a switch S–1 having a second contact A. A second switch S–2, having contacts $A^1$ and $B^1$, is also provided. The third branch of the output of carrier filter 30 is fed through carrier limiter 70 and phase shifter 80 to contact $A^1$ of switch S–2. In a manner to be described, switches S–1 and S–2 provide for selective operation of the adapter for the reception of the several types of signals previously mentioned.

Switch S–2, in the position shown, feds the output of carrier limiter 70 through phase splitter 90 to recombining detectors 100 and 105. These detectors combine the limited and phase-shifted carrier with either the unfiltered signal, when switch S–1 is at position A, or the output of carrier filter 30, when switch S–1 is at position B.

For an understanding of the operation of the remaining components of Fig. 1, it should be noted that the invention adapter is capable of receiving three types of modulation. These are (1) double-sideband amplitude modulation, (2) phase modulation and (3) single-sideband amplitude modulation.

In the reception of double-sideband amplitude modulation, the filtered carrier is fed to the recombining detector with a phase adjustment such that the filtered carrier is either zero or 180° out of phase with the carrier component of the original modulated wave. This re-combination gives the exalted carrier effect, restoring the relative amplitude relations of the carrier component and the modulating components. For example, in Fig. 1 the incoming signal wave from the output of mixer 10 to the contact A of switch S–1 is fed to recombining detector 100 either zero or 180° out of phase with the filtered carrier component fed to detector 100 through filter 30, limiter 70, phase shifter 80 and phase splitter 90. If detector 100 is of the multigrid type, either the zero or 180° phase relation may be used but, if the carrier is of the linear diode type, a phase relation of zero degrees displacement is used.

When phase modulation is received, the filtered carrier and the carrier component of the original modulated wave are adjusted to be either 90° or 270° out of phase. These phase relations may be used with either the linear diode or multigrid types of detector. This phase relation adjustment can, for example, be provided by recombining detector 105. The original modulated wave fed through contact A of switch S–1 would have a phase relation of 90° or 270° with the filtered carrier fed through components 30, 70, 80 or 90.

Phase splitter 90 functions normally to split the phase of the voltage at its input so that the voltage from its output to detector 100 is 90° out of phase with that to detector 105. For modulation reception, additional phase adjustment is provided by phase shifter 80, so that the resultant inputs to detector 100 are zero or 180° out of phase and those to detector 105 are 90° or 270° out of phase. By way of example, the voltage applied from phase splitter 90 to detector 100 might be 45° leading and that from splitter 90 to detector 105 be 45° lagging. For this particular phasing by phase splitter 90, phase shifter 80 should introduce a shift of 45° to bring the outputs of phase splitter 90 to the zero and 90° positions. Detector 100 might be adjusted to receive amplitude modulation and detector 105 to receive phase modulation.

Recombining detectors 100 and 105 are of the types customarily used in exalted-carrier detection. If they are of the diode type, the filtered carrier component is fed to them with a sufficient degree of exaltation, relative to the modulated carrier component, to provide exalted-carrier detection. If multigrid detectors are used, they are adjusted for dynamometer type operation, in which each grid is linear but the combined grids provide an output which is a product of the inputs to the separate grids. A more detailed description of such detectors may be found in my above-mentioned article "Exalted-Carrier Amplitude- and Phase-Modulation Reception."

For AMP and PM modulation reception, the outputs of detectors 100 and 105 are fed directly to separate contacts of a switch S–3, so that one or the other may be selected, dependent upon whether amplitude or phase modulation is to be received. For explanation purposes, it will be assumed that the phase shifts effected by components 80 and 90 arrange detector 100 for amplitude modulation reception and detector 105 for phase modulation reception. However, it will be understood that such arrangements may be reversed without in any way impairing the operation of the adapter.

The operation of the single-sideband selecting components will now be described with particular reference to Fig. 2. Referring to this figure, the incoming AM modulated wave having upper and lower sidebands is fed, through contact A of switch S–2, directly to detectors 100' and 105', corresponding to the detectors 100 and 105, respectively, of Fig. 1. The filtered carrier energy, with sidebands removed, is fed directly to detector 100' and through phase shifter 90' to detector 105'. Phase shifter 90' corresponds to phase splitter 90 of Fig. 1, and causes the carrier components fed to detectors 100' and 105' to be 90° apart in phase.

The outputs of the two detectors are audio frequency corresponding to the detected modulated incoming wave. In accordance with the previous assumption, the output of detector 100' would be a detection of incoming amplitude modulation, and that of detector 105' of incoming phase modulation. When these two outputs are combined in combining circuit 130', with a 90° audio phase shifter interposed, the resultant output of circuit 130' is that due to the lower sideband of the modulated wave input. When the same combination is made with the interposition of phase inverter 120', to reverse the phase of one of the detector outputs, the upper sideband may be obtained from combining circuit 135'.

Figure 2:
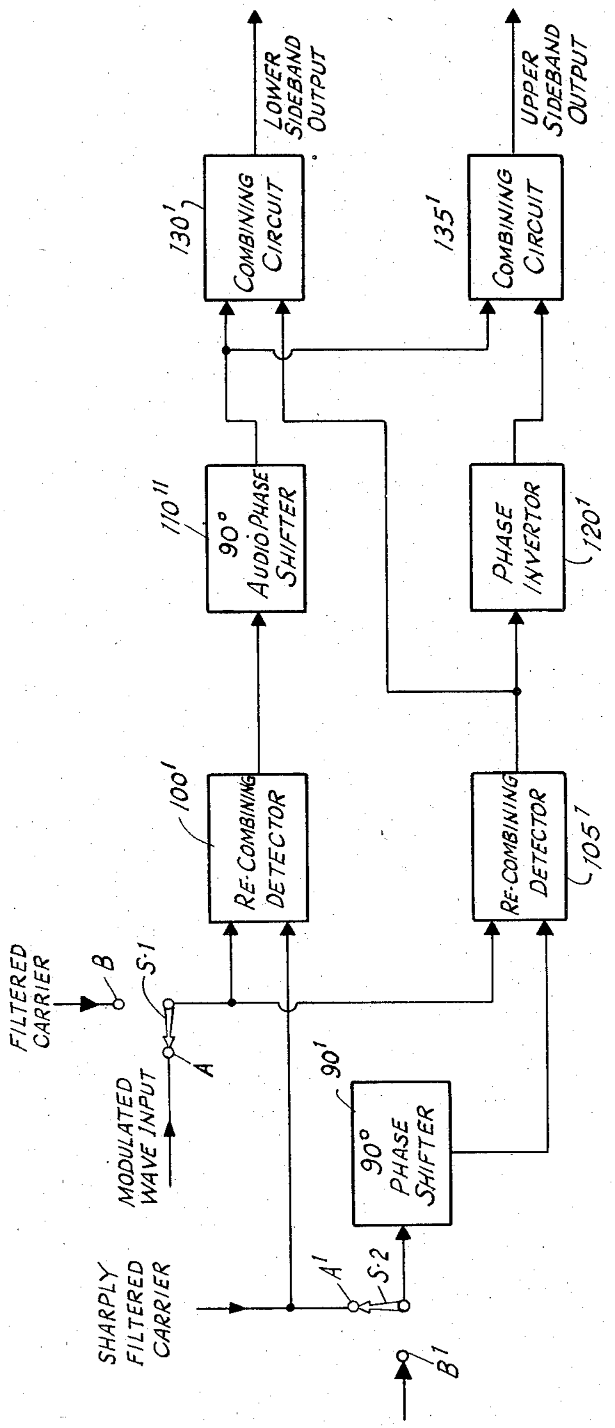
Fig. 2 is a schematic block diagram illustrating a single-sideband separation arrangement according to the invention.

The following analysis describes the operation of the single-sideband detecting systems shown in Fig. 2. The incoming sidebands, which enter at point A in Fig. 2, are given by:

$$e_1(\text{to detectors } 100' \text{ and } 105') = E_1 \sin(\omega \pm p)t \qquad (1)$$

Where $\omega$ is the carrier angular velocity and $p$ is the difference between the angular velocity of the carrier and that of the sideband. The plus or minus indicates whether the sideband is upper or lower, respectively. As indicated, these sidebands are fed to recombining detectors 100' and 105'.

The filtered carrier component is fed to detector 100' in the following form:

$$e_2(\text{to } 100') = E_2 \sin \omega t \quad (2)$$

The output of detector 100' is proportional to the two applied voltages, or $$e(\text{out of } 100') = E_1E_2k_1 \sin \omega t \sin(\omega \pm p)t \quad (3)$$

where $k_1$ is the detection constant which relates the detector output to the input voltages. The upper sideband component of Equation 3 is $$e_u = E_1E_2k_1 \sin \omega t \sin(\omega + p)t \quad (4)$$

which may be resolved to give:

$$= E_1E_2k_1\left[\frac{1}{2} \cos (-pt) - \frac{1}{2} \cos (2\omega + p)t\right] \quad (5)$$

Neglecting the radio-frequency component in (5) leaves $$e_u \text{ (out of } 100') = \frac{E_1E_2k_1}{2} \cos pt \quad (6)$$

The lower sideband component of Equation 3 is $$e_L = E_1E_2k_1 \sin \omega t \sin (\omega - p)t \quad (7)$$

which may be resolved to give $$e_L = E_1E_2k_1\left[\frac{1}{2} \cos (pt) - \frac{1}{2} \cos (2\omega t - p)t\right] \quad (8)$$

Neglecting the radio-frequency component results in $$e_L \text{ (out of } 100') = \frac{E_1E_2k_1}{2} \cos pt \quad (9)$$

The filtered carrier input to recombining detector 105' is shifted by 90° by means of phase shifter 90' so that it is given by $$e_2(\text{to } 105') = E_2 \cos \omega t \quad (10)$$

The output of detector 105' is $$e(\text{out of } 105') = E_1E_2k_2 \cos \omega t \sin (\omega \pm p)t \quad (11)$$

where $k_2$ is the detector constant of 105'. The upper sideband component of Equation 11 is $$e_u = E_1E_2k_2 \cos \omega t \sin (\omega + p)t \quad (12)$$

Equation 12 may be resolved to $$e_u = E_1E_2k_2\left[\frac{1}{2} \sin (2\omega + p)t - \frac{1}{2} \sin (-pt)\right] \quad (13)$$

Neglecting radio-frequency components gives $$e_u \text{ (out of } 105') = \frac{E_1E_2k_2}{2} \sin pt \quad (14)$$

The lower sideband component of Equation 11 is $$e_L = E_1E_2k_2 \cos \omega t \sin (\omega - p)t \quad (15)$$

which may be resolved to $$e_L = E_1E_2k_2\left[\frac{1}{2} \sin (2\omega - p)t - \frac{1}{2} \sin pt\right] \quad (16)$$

and, after radio-frequency terms are neglected, results in $$e_L \text{ (out of } 105') = -\frac{E_1E_2k_2}{2} \sin pt \quad (17)$$

From the above, the following components may be assembled as the outputs of detectors 100' and 105'

$$e_1 \text{ (out of } 100') = \overset{\text{Upper}}{\frac{E_1E_2k_1}{2} \cos pt} + \overset{\text{Lower}}{\frac{E_1E_2k_1}{2} \cos pt} \quad (18)$$

$$e_2 \text{ (out of } 105') = \overset{\text{Upper}}{\frac{E_1E_2k_2}{2} \sin pt} - \overset{\text{Lower}}{\frac{E_1E_2k_2}{2} \sin pt} \quad (19)$$

Phase shifter 110'' applies a 90° audio phase shift to the upper and lower sideband components appearing in the output of detector 100'. This phase shifter may use the type of design described in the above-mentioned article by R. B. Dome. In actual circuits it comprises certain networks in the output of detector 100' and similar networks in the output of detector 105', but the overall result is as though a single 90° phase shifter were in one of the detector outputs. This converts Equation 18 to $$e_1 \text{ (out of } 110'') = -\frac{E_1E_2k_1}{2} \sin pt - \frac{E_1E_2k_1}{2} \sin pt \quad (20)$$

Combining circuit 130' combines the output of detector 105' and phase shifter 110'' additively. This is equivalent to adding Equations 19 and 20. The normal adjustment of the combining circuit in 130' calls for an equalization of amplitude so that $k_1 = k_2 = k$. Hence, the addition of 19 and 20 results in the lower sideband component given by $$e_L(\text{out of } 130') = -E_1E_2k \sin pt \quad (21)$$

The phase inverter in unit 120' reverses the polarity of the output of detector 105' and therefore changes the signs in front of the two components of Equation 19 to give $$e_2 \text{ (out of } 120') = -\overset{\text{Upper}}{\frac{E_1E_2k_2}{2} \sin pt} + \overset{\text{Lower}}{\frac{E_1E_2k_2}{2} \sin pt} \quad (22)$$

Adding Equations 22 and 20 results in the upper sideband component at the output of 135' which is $$e_u(\text{out of } 135') = -E_1E_2k \sin pt \quad (23)$$

Thus, the combination of the carrier phase shift and the audio phase shift makes possible a combining in which the output of one or the other sidebands is cancelled. Accordingly, the invention receiver provides an output due to either sideband in the same manner as the conventional type of single-sideband receiver in which the sidebands are selected and rejected by a filter network. The requisite for this type of balancing separation is a source of carrier component synchronized with the carrier component of the received modulated wave, and this source is provided by the carrier filter 30 (Fig. 1) which selects the carrier component and rejects the sideband components.

In Fig. 2, audio phase shifter 110'' is shown as one block as compared to the two blocks 110 and 110' of Fig. 1. Actually, in the networks described by R. B. Dome, supra, the audio phase shifter takes the form of two networks performing the phase shifting by operating on phase-opposition branches of the waves, which are later recombined. The other components 120', 130' and 135' are the same as components 120, 130 and 135 of Fig. 1, and selectively combine two phase-shifted detector outputs in either aiding relation or subtractive relation to make the lower-sideband available at the output of one combining circuit and the upper sideband at the output of the other combining circuit.

When amplitude modulation is being received by my invention, the following connections are used: Switches S-1 and S-2 are thrown to position A, feeding modulated wave energy via switch S-1 and carrier energy via switch S-2. For double sideband reception, switch S-3 is switched to point "AM" to obtain the output of recombining detector 100. The carrier phase adjustment, produced by phase shifter 80 and phase splitter 90, is such that the carrier is either zero or 180° out of phase with the carrier component in the modulated wave from point A on switch S-1. This type of reception is ordinary exalted-carrier amplitude-modulation reception.

Phase modulation may also be received by throwing switch S-3 to point "PM." The type of phase modulation which may be received on this system is that which uses a peak phase deviation of approximately 1 radian or 57.3°. For this reception, the total phase shift of phase shifter 80 and phase splitter 90 is such as to displace the carrier component fed to recombining detector 105 by either 90° or 270°, with respect to the carrier in the modulated wave component received from point "A" on switch S-1.

Single-sideband reception may be obtained by throwing switch S-3 to point "L" for an output due to the lower sideband of the incoming wave, or to position "U" for an output due to the upper sideband of the incoming wave. These two positions may be used for the reception of the separate sideband components of either double-sideband amplitude modulation, phase modulation, or single-sideband amplitude modulation which is radiated from a single-sideband transmitter. In the cases of double-sideband waves, such as double-sideband amplitude modulation and phase modulation, advantages are gained in cases of interference by switching to single-sideband operation. For instance, if an interfering carrier is present on the lower-sideband component, reception may be accomplished by switching to the upper sideband so that the interference is rejected with the lower sideband. When single-sideband is radiated from the transmitter of the signal being received, the selection of the upper or lower sideband will, of course, depend upon which sideband is being radiated at the transmitter.

For CW or telegraph reception, beating oscillator 140 is switched on and S-2 is thrown to position "B." This provides a novel form of receiving CW telegraphy since the single-sideband rejection is utilized to remove the image interference which is usually encountered with such reception. For instance, let it be assumed that the intermediate frequency at the output of mixer 10 is 200 kc. For CW reception, the beating oscillator could be set at 201 kc. to produce a beatnote of 1000 cycles. The beating oscillator then acts as a carrier, and the incoming CW signal has a lower sideband. Normally, an interfering signal producing an intermediate frequency of 202 kc. would produce interference, but in this system, 202 kc. appears as the upper sideband of the beating oscillator at 201 kc. This interfering signal can be rejected by throwing switch S-3 to receive only the lower sideband and reject this upper sideband of interference. The added selectivity of this sideband rejection is very effective in practice. It is similar to "single signal" reception which has been accomplished by the use of a crystal filter with a selectivity characteristic having a rejection dip. (See "Radio Engineering," by F. E. Terman, second Ed., p. 582, or "The Radio Amateur's Handbook," 1947 edition, p. 162, or 1948 edition, p. 116.)

CW reception may be conducted with the use of the sharply selective filter 30. This is done by throwing switch S-1 to point "B" so that the incoming signal passes through filter 30 before being fed to the combining detectors. Normally, the high selectivity of carrier filter 30, limits the speed of telegraph reception in this manner to the slower speeds of transmission, but the high selectivity is a valuable aid in presence of interference and weak signals.

CW or telegraph reception is further aided by the function of the automatic frequency control. This control is sufficiently effective to hold the signal in tune with the carrier filters 30 and 40 regardless of the presence of the "off" portions of the on-and-off keying.

Frequency shift telegraphy may also be received in several different manners. One adjustment calls for tuning the space wave to the carrier filter frequencies and zero beating oscillator 140 to the space wave. Switch S-1 would be thrown to position A and switch S-2 to position B. When the signal is keyed to the mark frequency, which might be 800 cycles higher or lower than the space frequency, a beat is obtained which is equal to the degree of frequency shift. Hence, if the frequency shift is 800 cycles an 800 cycle beatnote would be obtained. If the shift is in the upward direction toward a higher frequency, switch S-3 is thrown to the upper sideband position. This connection rejects interference which would appear on the lower side of the space wave. For frequency shift reception, I have found that the automatic frequency control system maintains control of either the mark or the spacing wave if the time constant of the automatic-frequency-control system is made sufficiently slow.

Another method of receiving frequency-shift telegraphy calls of tuning the AFC system to either the mark or space wave to maintain frequency stability, and adjusting the beating oscillator halfway between the mark and space wave so that "mark" may appear in the upper sideband output and "space" may appear in the lower sideband output. This makes it possible to to feed a differential keyer from the U and L outputs to utilize both the mark and space waves for keying. Such differential keying devices are well-known to the art.

An additional novel feature which is provided by the system of this invention is a calibration system for measuring degree of phase or frequency modulation. Such a feature is ideal for a receiver of this type. I have found that when a frequency modulated signal is applied to this system, the automatic-frequency-control maintains control of the carrier component regardless of the depth of frequency or phase modulation applied to the frequency of phase modulated signal. In prior circuits of this type, the automatic-frequency-control system would jump to assume control of a sideband when the carrier component approached the low amplitudes which are encountered in phase or frequency modulation. Such a stable automatic frequency control system thus allows the observation of the carrier nulls for the measurement of decrease of frequency or phase modulation as described in my U. S. Patent No. 2,293,022 and in my article "A Method of Measuring Frequency Deviation," published in the RCA Review, April 1940. This method normally utilizes the carrier nulls to set the absolute value of the frequency or phase deviation. I have found that an indication is also obtained on this receiver for the sideband nulls. The measurement is made quite simply. The tone modulation depth is increased until fundamental tone output of the receiver strikes a minimum. This is the carrier null position which occurs at a value of 2.405 radians of phase deviation. The next null will be the null of the first sideband which occurs at a phase deviation of 3.82 radians. In this manner the nulls of the carrier and sidebands may be located to provide exact determinations of the degree of modulations. This type of a measurement is used as a basic standard for calibrating other systems of modulation measuring devices.

Figure 3:
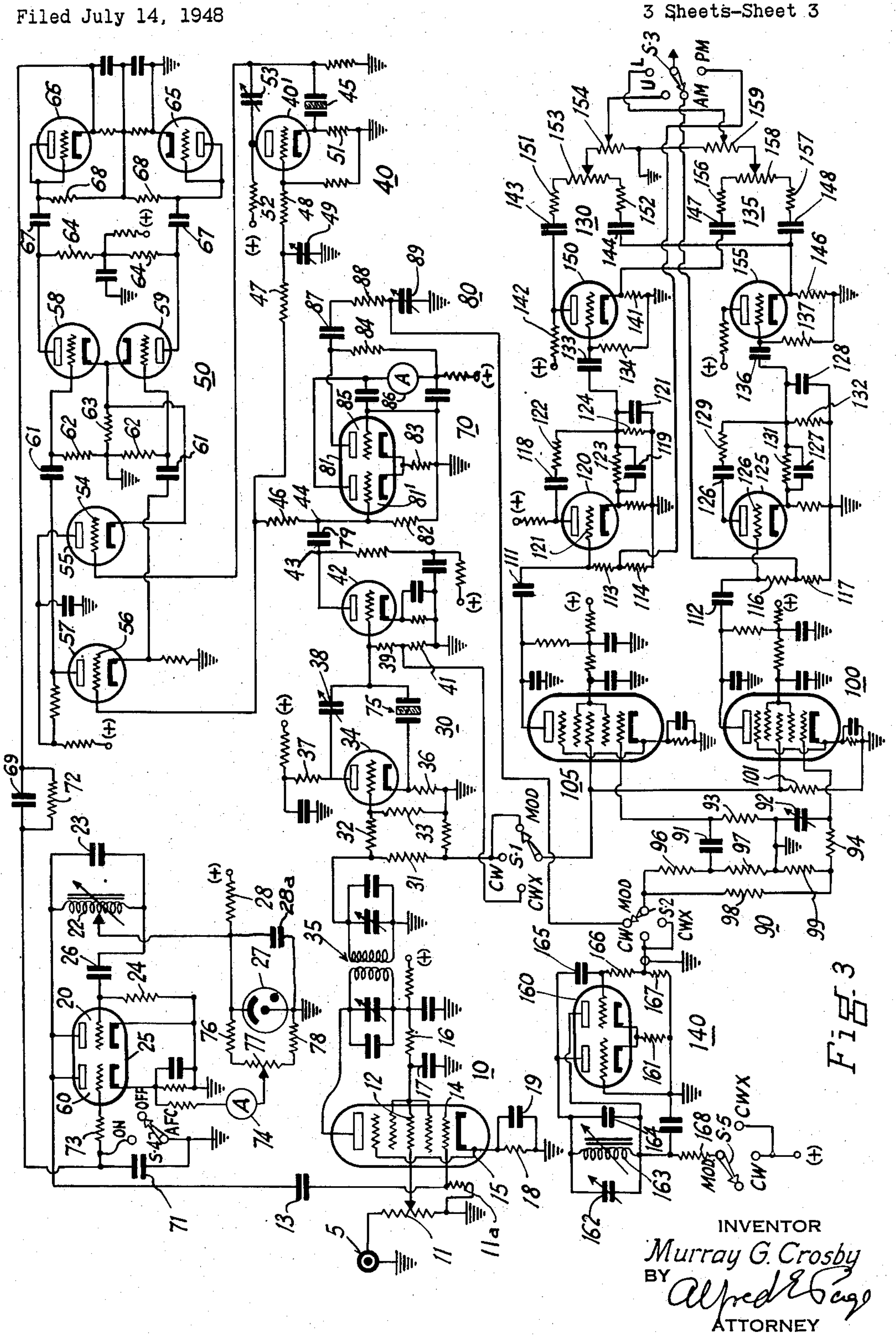
Fig. 3 is a schematic wiring diagram of a complete adapter embodying the invention.

Fig. 3 is a somewhat detailed wiring diagram of a receiver adapter unit embodying the invention. To facilitate a ready comprehension of the relation of the components, the reference characters of Figs. 1 and 2 have been applied to associated groups of electronic components.

Referring to Fig. 3, the intermediate input frequency to mixer 10 is applied to potentiometer 11, which controls the input level, and thence to the control grid 12 of mixer valve 15, while the output of oscillator tube 25 is capacity coupled, through condenser 13 and grid resistor 11*a*, to grid 14 of mixer 15. Screen voltage is applied to valve 15 through resistor 16 and by-pass condenser 17, and biasing is effected by resistor 18 and by-pass condenser 19.

Oscillator 20 and reactance tube 60 are preferably combined in a twin triode tube 25. The oscillator section 21 has a tuned tank circuit including tapped variable inductance 22 and condenser 23, with resistor 24 forming the grid leak and condenser 26 forming the grid capacitor. The plate voltage of the oscillator is stabilized, through the tap of inductance 22, by voltage stabilizer tube 27 which is fed through resistor 28. 28*a* is a plate by-pass condenser.

The output intermediate frequency of mixer valve 15 is applied to a tuned band-pass type transformer 35 having its primary and secondary windings tuned by parallel connected fixed and variable condensers. The secondary winding of transformer 35 is coupled through resistor 31 to the "CW" and "MOD" contacts of switch S–1. The selected intermediate frequency from transformer 35 is also fed, through resistance network 32, 33, to crystal filter 75 of filter 30. The resistance network acts as an isolating network and also adjusts the level of the energy input to phase inverter 34 which feeds driving and neutralizing energy to crystal 75. The driving energy is fed from cathode resistor 36, and neutralizing condenser 38 is adjusted to a capacity value equal to the holder of capacity value of filter crystal 75.

The output of crystal filter 75 is fed, through a voltage divider comprising resistors 39, 41, to contact "CWX" of switch S–1. The "CWX" positions on the three switch S–1, S–2 and S–5 are for the purpose of receiving CW telegraph signals through carrier filter 30. This type of receptior is used for slow-speed keyed signals where a higk degree of selectivity is required for eliminating interference or noise. The crystal filter output is also fed directly to a resistance coupled amplifier including a triode 42, which is cathode biased and has its plate coupled by condenser 43 to junction point 44.

The amplitude of the energy fed from point 44 to the automatic frequency control system is adjusted by resistor 46. This energy is fed to crystal filter 45 of filter 40 through a phasing network comprising resistors 47, 48 and condenser 49, together with the input capacity of triode 40′. Driving energy is fed to the crystal through cathode resistor 51 of tube 40′, and opposite phase neutralizing energy from plate isolating resistor 52. The holder capacity of crystal 45 is neutralized by adjustment of condenser 53, and the output of the crystal is applied to the grid 54 of the triode 55.

Energy from point 44 is also fed to the grid 56 of phase inverter 57. Phase inverter 57 and triode 55 are preferably combined in one envelope, although shown separately for convenience. Phase inverter 57 is coupled to the grids of triodes 58, 59 through condensers 61, 61 and resistors 62, 62. The cathodes of triodes 58, 59 are driven from the cathode circuit of triode 55 through the common cathode resistor 63. Network 47, 48, 49 in conjunction with the input capacity of triode 40′ comprises a phase shifter for adjusting the phase relation of the energy fed through crystal 45 and that fed to the grid 56 of triode 57.

The plate resistors 64, 64 of triodes 58, 59 are coupled to the inputs of differential detectors 65, 66 through condensers 67, 67 and resistors 68, 68. The outputs of detectors 65, 66 are applied, through a time constant network comprising condensers 69, 71 and resistor 72 to the grid of reactance tube section 60 of envelope 25.

Triode reactance tube 60 utilizes the grid-to-plate capacity in conjunction with grid resistor 73 to provide phase shifted voltage from the plate to the grid circuit in the manner of the usual reactance tube. A meter 74 serves as a tuning indicator of the magnitude of the cathode current of reactance tube 60. A switch S–4 serves as a control to switch the AFC off or on. With switch S–4 in the "off" position, the meter is zeroed to the in-tune position by adjustment of a compensating network comprising resistors 76, 77, 78. In the "on" position of switch S–4, the grid of tube 60 is connected to the time constant network 69, 71, 72.

The output of carrier filter 30 is fed to carrier limiter 70, which is of the type described in my U. S. Patent No. 2,276,565 and in my article "Two-Terminal Oscillator" published in the May 1946 issue of "Electronics." Condenser 79 couples the filtered carrier energy to the grid resistor 82 of the input triode section 75 of dual triode 81. Triode section 75 is cathode coupled to output section 85 by common resistor 83, and the output of limiter 70 is derived from plate resistor 84. Meter 86 serves as a carrier strength indicator, as I have found that a meter in the circuit of the input triode, as shown, indicates the level of the input energy fed to this type of limiter. In a typical example, meter 86 may read approximately 2 ma. without input to limiter 70 and approximately 8 ma. for the normal limiting input level.

The limited carrier energy is fed through coupling condenser 87 to the phase shifter 80 comprising resistor 88 and variable condenser 89. The network 88, 89, through adjustment of condenser 89, provides a phase adjustment to control the phase relations of recombination of the filtered and limted carrier and the original signal wave or intermediate frequency from mixer 10. The output of phase shifter 70 is connected to the "MOD" contact of switch S–2.

The phase splitter 90 for the recombining detectors comprise condensers 91, 92 and resistors 93, 94. Resistors 96, 97 and 98, 99 act as a volttage divide to adjust the input level to the grids of recombining detectors 100, 105. Phase splitter 90 provides a 45° leading phase shift to one grid and a 45° lagging phase shift to the other grid.

The input to recombining detectors 100, 105 is fed from switch S–1, which may be connected either to transformer 35, to obtain the intermediate frequency output of mixer 10, or to carrier filter 30 to obtain the filtered carrier. The recombining detectors are cathode biased, and have a common grid return resistor 101. The screens are fed from a suitable source of positive potential, as shown.

The output of recombining detector 105 is applied, through a condenser 111, to a voltage dividing network comprising resistors 113, 114, and also to the grid of a triode 120. The junction point of network 113, 114 is connected to the "PM" contact of switch S–3 for phase modulation reception.

Similarly, the output of detector 100 is applied, through a condenser 112, to a voltage dividing network comprising resistors 116, 117, and also to the grid of a triode 125. The junction point of networks 116, 117 is connected to the "AM" contact of switch S–3 for amplitude-modulation reception.

The triodes 120, 125, though shown separately, are preferably combined in a single envelope. These triodes act as phase inverters to feed phase opposition voltages to the two branches of "Dome" networks. The first branch comprises condensers 118, 119 and 121 and resistors 122, 123 and 124. The second branch comprises condensers 126, 127 and 128 and resistors 129, 131 and 132.

The output of the first branch is fed through a coupling, comprising a condenser 133 and a resistor 134, to a triode 150 acting as a phase inverter, and that of the second branch is fed through a condenser 136-resistor 137-coupling to a triode phase inverter 155. Triodes 150, 155 may, in practice, be included in a single envelope.

Inverters 150, 155 provide two cathode outputs, from resistors 141 and 146, respectively, and one plate circuit output from resistor 142, which are fed to the combining networks 130, 135 to select the proper combinations to effect the upper and lower sideband balancing actions. The couplings are effected through condensers 143, 144, 147 and 148.

Combining network 130 comprises resistors 151, 152 and potentiometers 153, 154, and combining network 135 comprises resistors 156, 157 and potentiometers 158, 159. The balance between the output of recombining detector 105, through plate-circuit resistor 142, and the output of detector 100, through cathode resistor 146, is adjusted by potentiometer 153. Potentiometer 154 controls the amplitude of the output. This combination is a phase opposition combination by virtue of using one cathode output and one plate-circuit output, and is fed to contact "U" of switch S–3 to obtain the lower sideband output.

The balancing of the in-phase combination of recombining detectors 100, 105 is effected by potentiometer 158, with potentiometer 159 adjusting the amplitude. This combines the outputs of the two cathode circuits including resistors 141 and 146, and the combined outputs are fed to contact "L" of switch S–3 to obtain the lower sideband output.

Beating oscillator 140 is provided for CW telegraph reception, and also for operation of the receiver adapter as a frequency or phase deviation measuring device. The oscillator may be of the type described in my U. S. Patent No. 2,269,417 and in my article "Two-Terminal Oscillator" in "Electronics," supra. As shown, it includes a twin triode 160 having a common cathode resistor 161. The tuned circuit includes variable condenser 162, variable inductance 163 and condenser 164. A feed-back condenser 165 is coupled to grid resistors 166, 167, and an isolating and plate-voltage reducing resistor 168 is connected to switch S–5.

The three switches S–1, S–2 and S–5 are ganged together for unit or simultaneous operation to obtain three types of reception. In the "CWX" position, oscillator 140 is energized and connected to phase splitter 90 through S–5 and S–2, respectively, and the output of carrier filter 30 is connected to recombining detectors 100, 105. The incoming signal is thus fed through the carrier filter before being fed to detectors 100, 105. While the high selectivity of filter 30 limits the speed of telegraph reception to the slower transmission speeds, the high selectivity is a valuable feature in the presence of interference and weak signals.

In the "CW" position, oscillator 140 is again energized and detectors 100, 105 are fed the incoming signal directly from mixer 10. Switch S–3 may be set at either "L" or "U" to reject either the upper or lower sideband to remove image interference.

In the "MOD" position, oscillator 140 is "off" and disconnected from phase splitter 90. The modulated wave is fed to detectors 100, 105 from mixer 10 through switch S–1, and the filtered carrier is fed to detectors 100, 105 from phase shifter 80 through switch S–2 and phase splitter 90. Amplitude modulation is then received by placing switch S–3 in the "AM" position to obtain the output of recombining detector 100. Phase modulation is received with switch S–3 in the "PM" position to obtain the output of detector 105. The upper or lower sideband of double-sideband waves in either amplitude modulation or phase modulation is received by throwing switch S–3 to the "U" or "L" position respectively. Thus, an interfering carrier on either the upper or lower sideband may be effectively rejected. When single-sideband modulation is transmitted, the position of switch S–3 will depend upon which sideband is radiated by the transmitter.

The invention unit thus provides a novel, flexible receiver of the exalted carrier capable of effectively receiving several types of modulated signals or telegraphic signals. Effective elimination of sideband grabbing by the automatic frequency control is effected by feeding the carrier through a second sideband eliminating filter 30 before feeding it to the automatic frequency control circuits.

The receiver is capable of effecting single-sideband reception on either AM or PM through a balancing action in combination with a wide-band phase-shift network. This feature may be used in conjunction with a beating oscillator to eliminate image beat-note interference in the reception of CW telegraphy, and to provide a new type of reception of frequency-shift telegraphy in which the unused space-wave is rejected by the sideband separation networks.

Furthermore, the receiver may be used as a convenient device for observing and/or measuring the degree of modulation of a frequency, phase, or frequency-shift modulator.

While specific embodiments of the invention have been shown and described in detail to illustrate the application of the principles thereof, it will be understood that the invention may be otherwise embodied without departing from such principles.

What is claimed is:

1. A signal receiver comprising, in combination, means for receiving modulated signal waves, filter means for filtering the signal waves to attenuate the modulations to derive a filtered carrier output, circuit means for combining the received modulated wave with the filtered carrier output and detecting the signal modulations to derive a first audio frequency output, means for shifting the phase of the filtered carrier output to derive a phase-shifted carrier output, means for combining the received modulated wave with the phase-shifted carrier output and detecting the signal modulations to derive a second audio frequency output and means, including combining circuit means connected to the audio frequency outputs, phase inverter means connected between one audio frequency output and said combining circuit means, and phase shift network means connected between at least one audio frequency output and said combining circuit means, for combining the audio frequency output to derive the output due to one sideband modulation and to reject the output due to the other sideband modulation.

2. A signal receiver comprising, in combination, means for receiving modulated signal waves, filter means for filtering the signal waves to attenuate the modulations to derive a filtered carrier output, means for combining the received modulated wave with the filtered carrier output and detecting the signal modulations to derive a first audio frequency output, phase shifting means for shifting the phase of the filtered carrier output to derive a phase-shifted carrier output, means for combining the received modulated wave with the phase-shifted carrier output and detecting the signal modulations to derive a second audio frequency output, other phase shifting means for shifting the relative phase of the two audio frequency outputs, means for inverting the phase of one of the audio frequency outputs, and means for combining the phase shifted audio frequency output with the phase-inverted audio frequency output to derive the output due to one sideband modulation and reject the output due to the other sideband modulation.

3. A signal receiver comprising, in combination, means for receiving modulated signal waves, filter means for filtering the signal waves to attenuate the modulations to derive a filtered carrier output, means for combining the received modulated wave with the filtered carrier output and detecting the signal modulations to derive a first audio frequency output, phase shifting means for shifting the phase of the filtered carrier output to derive a phase-shifted carrier output, means for combining the received modulated wave with the phase-shifted carrier output and detecting the signal modulations to derive a second audio frequency output, other phase shifting means for shifting the relative phase of the two audio frequency outputs and combining the audio frequency outputs to provide a first combined audio frequency output, phase inverter means for inverting the phase of one of the audio frequency outputs and combining the phase-shifted audio frequency output with the phase-inverted audio frequency output, to provide a second combined audio frequency output, and selector means for selecting one of said combined audio frequency outputs to derive the output due to one sideband modulation and to reject the output due to the other sideband modulation.

4. A signal receiver comprising, in combination, means for receiving continuous wave telegraphic signals, filter means for filtering the received wave to derive a filtered carrier output, means for utilizing the filtered carrier output to control the frequency of a generated wave, a mixer for mixing the controlled wave with the received wave to obtain an intermediate frequency output, means for generating a fixed frequency, means for splitting said fixed frequency into two phase displaced outputs, a pair of combining means for combining the phase displaced outputs with the intermediate frequency output to provide a beat signal output, and means including combining circuit means connected to the combining means, phase inverter means connected between one combining means and said combining circuit means, and phase shift network means connected between at least one combining means and said combining circuit means, for combining the beat frequency output with a received interfering signal to derive the sideband of the beat frequency output and reject the interfering signal.

5. A signal receiver comprising, in combination, a source of signal modulated intermediate frequency waves; a mixer coupled to said source; a first filter coupled to the output of said mixer and effective to attenuate the carrier modulations; limiting means connected to the output of said first filter; a phase splitting network; a pair of recombining detectors having their inputs coupled to said phase splitting network, one of said detectors being operative to detect phase modulations and the other to detect amplitude modulations; means selectively operable to couple said phase splitting network to said filter and limiting means during reception of phase or amplitude modulated signal waves and to couple said detectors to said mixer; and an audio frequency output selectively connectible to the output of either of said detectors.

6. A signal receiver comprising, in combination, a source of signal modulated intermediate frequency waves; a mixer coupled to said source; a first filter coupled to the output of said mixer and effective to attenuate the carrier modulations; a carrier limiter coupled to the output of said first filter; a phase shift network coupled to the output of said limiter; a phase splitting network; a pair of recombining detectors having their inputs coupled to said phase splitting network, one of said detectors being operative to detect phase modulations and the other to detect amplitude modulations; means selectively operable to connect said phase splitting network to said phase shift network during reception of phase or amplitude modulated signal waves and to couple said detectors to said mixer; and an audio frequency output selectively connectible to the output of either of said detectors.

7. A signal receiver comprising, in combination, a source of signal modulated intermediate frequency waves; a mixer coupled to said source; a first filter coupled to the output of said mixer and effective to attenuate the carrier modulations; a carrier limiter coupled to the output of said limiter; a phase splitting network; a pair of recombining detectors having their inputs coupled to said phase splitting network, one of said detectors being operative to detect phase modulations and the other to detect amplitude modulations; means selectively operable to connect said phase splitting network to said phase shift network during reception of phase or amplitude modulated signal waves and to couple said detectors to said mixer; an audio frequency output selectively connectible to the output of either of said detectors; a second filter coupled to the output of the first filter and effective to further attenuate the carrier modulations to obtain an output due substantially to the carrier per se; and an automatic frequency control system coupled to the output of said second filter and coupled to said mixer; whereby "sideband grabbing" of the automatic frequency control system is substantially eliminated.

8. A signal receiver comprising, in combination, a source of signal modulated intermediate frequency waves; a mixer coupled to said source; a first filter coupled to the output of said mixer and effective to attenuate the carrier modulations; a carrier limiter coupled to the output of said first filter; a phase shift network coupled to the output of said limiter; a phase splitting network; a pair of recombining detectors having their inputs coupled to said phase splitting network, one of said detectors being operative to detect phase modulations and the other to detect amplitude modulations; means selectively operable to connect said phase splitting network to said phase shift network during reception of phase or amplitude modulated signal waves and to couple said detectors to said mixer; a pair of audio phase shift networks each coupled to one of said detectors; a first combining circuit coupled to said audio phase shift networks and effective to provide an output due to lower sideband modulations only; a phase inverter connected to the other audio phase shift network; a second combining circuit coupled to said phase inverter and effective to provide an output due to upper sideband modulations only; an audio frequency output; and means operable to connect the latter selectively to either of said combining circuits or directly to the output of either of said detectors.

9. A signal receiver comprising, in combination, a source of signal modulated intermediate frequency waves; a mixer coupled to said source; a first filter coupled to the output of said mixer and effective to attenuate the carrier modulations; a carrier limiter coupled to the output of said first filter; a phase shift network coupled to the output of said limiter; a phase splitting network; a pair of recombining detectors having their inputs coupled to said phase splitting network, one of said detectors being operative to detect phase modulations and the other to detect amplitude modulations; an audio frequency output selectively connectible to the output of either of said detectors; a second filter coupled to the output of the first filter and effective to further attenuate the carrier modulations to obtain an output due substantially to the carrier per se; an automatic frequency control system coupled to the output of said second filter and coupled to said mixer, whereby "sideband grabbing" of the automatic frequency control system is substantially eliminated; a pair of audio phase shift networks each coupled to one of said detectors; a first combining circuit coupled to said audio phase shift networks and effective to provide an output due to lower sideband modulations only; a phase inverter connected to the other audio phase shift network; a second combining circuit coupled to said phase inverter and effective to provide an output due to upper sideband modulations only; an audio frequency output; a beat frequency oscillator; ganged switch means selectively operable, during reception of phase or amplitude modulation, to connect said phase splitting network to said phase shifting network and said detectors to said mixer, and to disconnect said oscillator, and, during reception of continuous wave telegraph, to connect said phase splitting network to said oscillator and said detectors to the output of said mixer, and, during reception of frequency shift telegraphy, to connect said phase splitting network to said oscillator and said detectors to the output of said first carrier filter; and other switch means operable to connect the audio frequency output selectively to either of said combining circuits or directly to the output of either of said detectors.

10. A signal receiver comprising, in combination, means for receiving modulated signal waves, filter means for filtering the signal waves to attenuate the modulations to derive a filtered carrier output, a circuit means for combining the received modulated wave with the filtered carrier output and detecting the signal modulations to derive a first audio frequency output, means for shifting the phase of the filtered carrier output to derive a phase-shifted carrier output, means for combining the received modulated wave with the phase-shifted carrier output and detecting the signal modulations to derive a second audio frequency output, and means, including a pair of audio phase shifting networks each connected to a different audio frequency output, combining circuit means connected to each phase shifting network, a phase inverter connected between one network and said combining circuit means, for combining said audio frequency outputs to derive the output due to one side-band modulation and to reject the output due to the other side-band modulation.

MURRAY G. CROSBY.

REFERENCES CITED

The following references are of record in the file of this patent:

UNITED STATES PATENTS

| Number | Name | Date |
|---|---|---|
| 2,019,446 | Crosby | Oct. 29, 1935 |
| 2,075,526 | Koch | Mar. 30, 1937 |
| 2,115,360 | Crosby | Apr. 26, 1938 |
| 2,260,707 | Fair | Oct. 28, 1941 |
| 2,266,658 | Robinson | Dec. 16, 1941 |
| 2,282,971 | Koch | May 12, 1942 |
| 2,302,951 | Peterson | Nov. 24, 1942 |
| 2,316,017 | Peterson | Apr. 6, 1943 |
| 2,333,335 | Peterson | Nov. 2, 1943 |
| 2,416,795 | Crosby | Mar. 4, 1947 |
| 2,494,323 | Weber | Jan. 10, 1950 |

OTHER REFERENCES

Electronics, December 1945, pages 150 and 151; Reduction Heterodyne Interference, by H. W. Belles.